United States Patent [19]
Utan

[11] Patent Number: 5,586,335
[45] Date of Patent: Dec. 17, 1996

[54] METHOD AND APPARATUS FOR PROGRAMMING A PROGRAMMABLE CONTROLLER WITH A LADDER DIAGRAM BY ENTERING MULTIPLE DEVICE NAMES FOR EACH LADDER SYMBOL AND BY STORING COMMON LADDER SEGMENTS

[75] Inventor: Daiji Utan, Aichi, Japan

[73] Assignee: Mitsubishi Denki Kabushiki Kaisha, Tokyo, Japan

[21] Appl. No.: 254,423

[22] Filed: Jun. 6, 1994

Related U.S. Application Data

[63] Continuation of Ser. No. 661,366, Feb. 27, 1991, abandoned.

[30] Foreign Application Priority Data

Mar. 2, 1990 [JP] Japan .................................. 2-51106

[51] Int. Cl.⁶ .............................. G06F 3/03; G06F 9/24
[52] U.S. Cl. ...................... 364/147; 395/326; 364/474.22
[58] Field of Search .................................. 395/800, 775, 395/200, 325, 275, 250, 141, 155, 159, 162, 110, 500, 832, 375, 700; 364/147, 146, DIG. 1, DIG. 2, 188, 192, 474.22, 551.02, 578, 474.11; 340/825.34

[56] References Cited

U.S. PATENT DOCUMENTS

| | | | |
|---|---|---|---|
| 4,247,909 | 1/1981 | Bradley et al. | 364/147 |
| 4,449,180 | 5/1984 | Ohshima et al. | 364/147 |
| 4,870,614 | 9/1989 | Quatse | 395/375 |
| 4,939,437 | 7/1990 | Farag et al. | 318/473 |
| 4,991,076 | 2/1991 | Zifferer et al. | 364/14.7 |
| 4,994,957 | 2/1991 | Komiya et al. | 364/147 |
| 5,058,052 | 10/1991 | Sexton et al. | 395/375 |
| 5,126,956 | 6/1992 | Komiya et al. | 364/474.22 |
| 5,212,631 | 5/1993 | Schmidt et al. | 364/DIG. 1 |

FOREIGN PATENT DOCUMENTS

| | | |
|---|---|---|
| 0092312 | 10/1983 | European Pat. Off. . |
| 2499727 | 8/1982 | France . |
| 3222305 | 12/1982 | Germany . |
| 61-123909 | 6/1986 | Japan . |
| 63-18401 | 1/1988 | Japan . |
| 2077966 | 12/1981 | United Kingdom . |

OTHER PUBLICATIONS

Conference Proceedings IEEE Southeastcon, 85 Apr. 3, 1985, pp. 29–33; Andrew Lee Marshall; "SORCON—A Software Relay Control System".
Patent Abstracts of Japan, vol. 5, No. 196 (Dec. 21, 1981) JP 56118106.
Patent Abstracts of Japan, vol. 10, No. 312 (Oct. 23, 1986) JP 61123909.

*Primary Examiner*—Daniel H. Pan
*Attorney, Agent, or Firm*—Sughrue, Mion, Zinn, Macpeak & Seas

[57] ABSTRACT

A programmable controller which allows the operator to input a ladder symbol followed by device names separated by logical operators in lieu of entering the redundant ladder symbol for each device name. The logical operator is identified during the conversion into a ladder diagram display so that the program instruction will be properly interpreted and displayed. Commonly used ladder diagram segments may be stored in lo advance and subsequently inserted into the programmable controller program being written, after conversion of device names to suit the configuration for which a ladder program is presently being written.

28 Claims, 13 Drawing Sheets

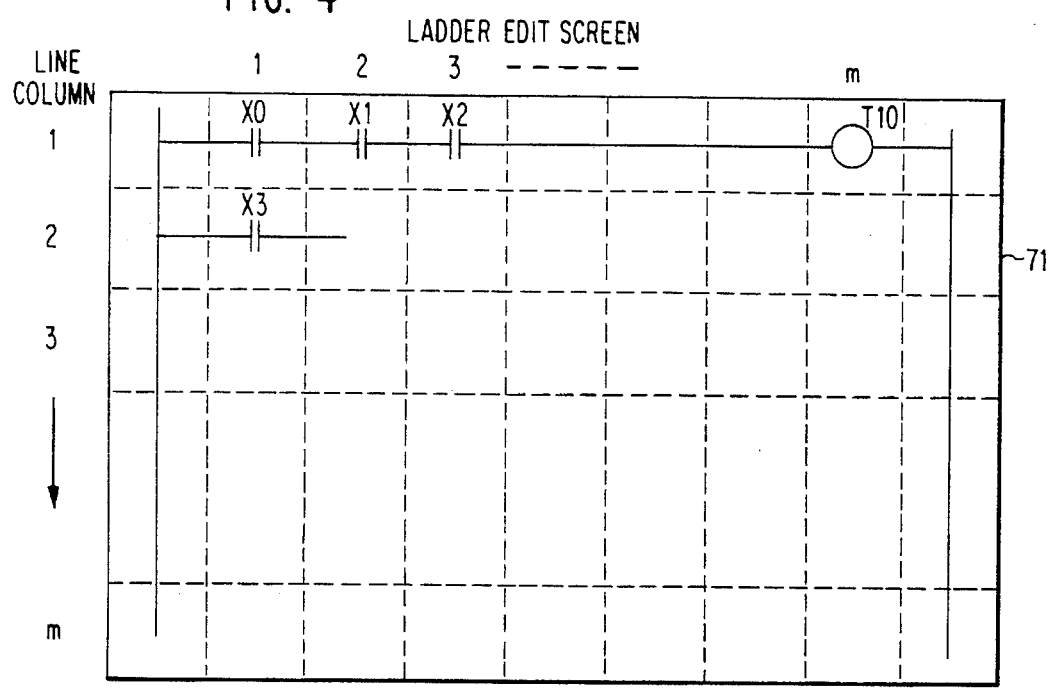

FIG. 12

STANDARD CIRCUIT — E4
(REGISTER FIXED DEVICES) — E5
DEVICE — E6

| DEVICE | ABBREVIATION 12345678 9 12345678 | — E7 |

FD0
FD1
FD2
FD3
FD4
FD5
FD6
FD7
FD8
FD9
FD10
FD11
FD12
FD13
FD14
FD15

FD16
FD17
FD18
FD19
FD20
FD21
FD22
FD23
FD24
FD25
FD26
FD27
FD28
FD29
FD30
FD31

DEVICE — E6
ABBREVIATION 12345678 9 12345678 — E7

PAGE UP  PAGE DOWN                    END:       ESC:

MODE CLEAR — E10                CUT   PASTE
                                 E8    E9

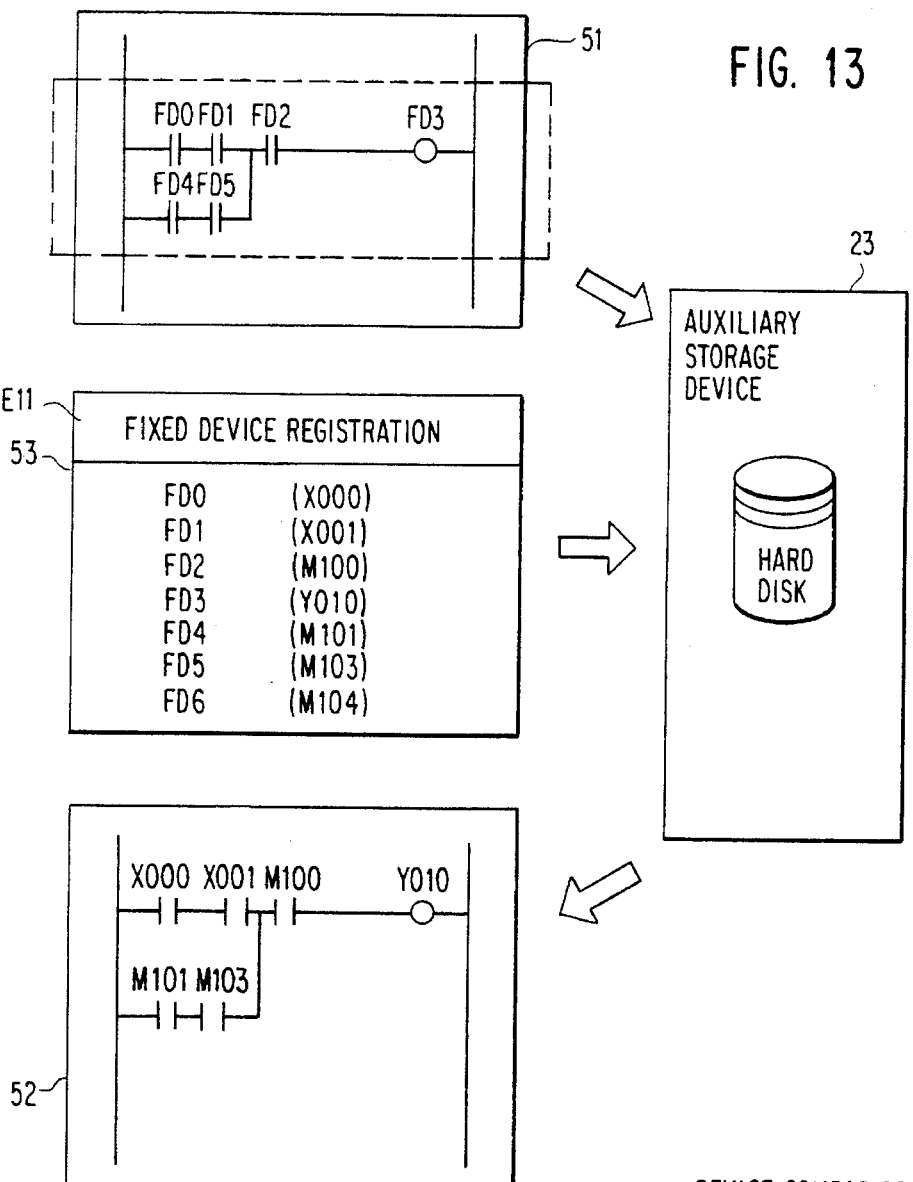

METHOD AND APPARATUS FOR PROGRAMMING A PROGRAMMABLE CONTROLLER WITH A LADDER DIAGRAM BY ENTERING MULTIPLE DEVICE NAMES FOR EACH LADDER SYMBOL AND BY STORING COMMON LADDER SEGMENTS

This is a Continuation of application Ser. No. 07/661,366 filed Feb. 27, 1991 now abandoned.

FIELD OF THE INVENTION

The present invention relates to a process of programing a programmable controller (hereinafter referred to as a "PC"). In particular, the invention concerns a method of writing a ladder diagram for display on a CRT screen.

DESCRIPTION OF THE BACKGROUND ART

FIG. 1 is a block diagram showing the conventional hardware configuration of a PC programming unit. In FIG. 1, a microprocessor 21 is connected by a bus 20 to a main storage device 22 comprising RAM, ROM, etc., an auxiliary storage device 23 such as a hard disk or a floppy disk, a keyboard 24, acting as an input means, a display device 25, and a printer 26.

FIG. 2 is a block diagram illustrating the flow of processing and data during the writing of a ladder diagram in a conventional programing unit. Referring to FIG. 2, the keyboard 24 is used to input data, which is temporarily stored in a keyed-in data buffer 12. The buffer 12 is connected to a ladder symbol data extraction processor 13 for extracting a ladder symbol part from the input data in the keyed-in data buffer 12, and to a device name extraction processor 14 for fetching a device name from the input data in the keyed-in data buffer 12. An instruction code conversion processor 15 communicates with the ladder symbol data extraction processor 13 and converts the ladder symbol data into a PC instruction. Similarly, a device code conversion processor 16 communicates with the device name extraction processor 14 and converts device name data into an internal code. Both of the code conversion units 15 and 16 provide outputs to screen image table creation processor 17, which generates data for displaying the ladder diagram on the display device 25 in accordance with the data obtained in the code conversion process conducted by the units 15 and 16. A block position control processor 18 is operative to indicate the position on the display device 25 where the ladder diagram image is to be created, and is responsive to inputs of line and column data from code conversion unit 15. Information from screen image table creation processor 17 is used to update the information stored in processor 18. A screen display data converter 19 will convert screen image table data from processor 17 for display on the display device 25 and will control display of that data at specified locations on the screen of display device 25.

FIG. 3 illustrates a display screen 70 having a ladder area 71, along with ladder symbol and keyed-in data display area 72. For each of screens 70A–70F, there is illustrated the sequence of key strokes used and display screens created during the writing of a ladder diagram in the conventional programming unit. This figure, together with the other aforementioned drawings may be used to explain the operation of the conventional unit in creating a PC program using the ladder diagram technique.

Referring to FIG. 1, the microprocessor 21 runs a control program stored in the main storage device 22. The control program is designed to permit the programming unit to enter a PC program creation mode when a new program is to be written using the ladder technique. Once in the PC program creation mode, the operator can enter a sequence of commands, by pressing designated keys on the keyboard to enter ladder symbols and specify the identity of PC devices. Specifically, with reference to FIG. 3, with the cursor 73 at a desired display location (here, at the start of a screen), a key on the keyboard 24 corresponding to a ladder symbol 101 is pressed, which will result in a display of the ladder symbol in the keyed-in data display area 72, as seen in the screen 70A, and then keys (here, X, O) for specifying a PC device are pressed and the keyed data is displayed in keyed-in data display area 72, as seen on screen 70B, and simultaneously the keyed-in data is stored into the keyed-in data buffer 12. By pressing a return key 104 on the keyboard 24, the data in the keyed-in data buffer 12 is output to the symbol part extraction processor 13 and the device name extraction processor 14. The symbol data is converted into an instruction code by the instruction code conversion processor 15 according to preceding and succeeding states of the ladder diagram. The device name data is checked for proper PC specifications and input format by the device code conversion processor 16, and then converted into an internal processing code. The first ladder element and device name are then displayed as seen in screen 70C, with the aid of elements 17–19. The keyed in display data area 72 is cleared at this time. The next ladder element is similarly displayed in area 72 by pressing key 105, as illustrated in screen 70D, and the next device is displayed by pressing the appropriate keys, as illustrated in screen 70E. After processing in the manner above described, the ladder symbol and device identification are inserted at the cursor 73 position after pressing return key 104, as seen in screen 70F.

FIG. 4 shows a detailed view of the ladder diagram create/edit area 71 on display screen 70 of FIG. 3. The display area is separated into a plurality of blocks, defined by the matrix of dotted lines, in which ladder symbols and device numbers are displayed. As seen in FIG. 4, each row of blocks is identified by a line number (1, 2, 3, . . . m) and each column of blocks is identified by a column number (1, 2, 3, . . . n). Each block can contain the identification of a device (X0, X1, X2, X3, . . . Y10), an appropriate ladder symbol, and/or connector lines.

The screen image table, shown in FIG. 5A, is created in the main storage device 22, in correspondence with the line and column positions of the blocks. After the block position control processor 18 has calculated the address in the screen image table in accordance with the line and column positions indicated by the cursor 73 in the ladder diagram create/edit area 71, the ladder data converted into an instruction code and the device data converted into a device code are stored together, in the format of FIG. 5B, in the corresponding screen image table by the screen image table creation processor 17. At the same time, the table creation processor 17 provides the block position controller 18 with a command to progress to the next line or column position. The data in the screen image table is converted into data displayable on the display device 25 by the screen display conversion processor 19 and displayed on the display device 25 in a predetermined format. By repeating the foregoing operation, via a sequence of keying operations and screen displays as previously described in FIG. 3, the data entered from the keyboard 24 is displayed on the display device 25 and the ladder diagram is created.

FIG. 15 is a block diagram illustrating registration and reutilization of a "common" ladder diagram in the conventional unit. Referring to FIG. 15, the numeral (24) indicates an input means such as a keyboard, (2a) a control means for controlling internal operation in accordance with input data, (3a) a ladder program writing means, (4a) a ladder diagram writing means for fetching a common ladder diagram from a ladder program, and (7a) an auxiliary storage device read/write means for transferring data to and from the auxiliary storage device (23).

Operation of the block diagram shown in FIG. 15 will now be described. A PC ladder diagram is written by entering ladder symbols and device numbers of the PC from the keyboard (24) by means of the control program stored in the main storage device (22) and the results are displayed on the display device (25). The written program is sequentially converted inside the main storage device (22) into a program executable by the corresponding PC. After this conversion, the program can be stored in the auxiliary storage device (23) and/or output to the printer (26).

If a like ladder pattern is repeated during writing of the ladder program or if there is a ladder block usable by another PC, a "common" ladder diagram area can be cut from the ladder program as written using the common ladder diagram writing means (4a) and written to the auxiliary storage device (23) via the auxiliary storage device read/write means (7).

When that common ladder diagram area is required later during writing of the ladder program, it can be read from the auxiliary storage device (23) through the auxiliary storage device read/write means (7) and inserted into the ladder program currently being written. Thus a library of commonly used ladder diagram areas or segments may be maintained in storage device (23).

FIG. 16 shows the device and sequence of screens and data displayed during the above conventional operation. In FIG. 16, the area of the common ladder diagram enclosed by the dotted line is written to the auxiliary storage device (23) using the writing means (4a) and the auxiliary storage device read/write means (7a). Later, the common ladder diagram is read from the auxiliary storage device (23) through the auxiliary storage device read/write means (7a) and added to the program currently being written.

As previously noted in FIG. 3, the entered ladder symbol and the specified device are displayed in the ladder diagram create/edit area and the cursor moves to the next block. However, the prior art programming unit configured as described above has a disadvantage in that a programmer cannot write a ladder diagram in terms of logical operation expressions because one device must be specified for one symbol, and, also, many keys must be pressed if a complicated ladder diagram is to be written.

Also, the conventional programming process described above has a disadvantage in that device numbers in an already registered common ladder diagram must be corrected in accordance with PC devices in the program now being written if that common ladder diagram is to be reutilized.

SUMMARY OF THE INVENTION

It is, accordingly, an object of the present invention to overcome the disadvantages in the prior art by providing a PC programing unit which uses a ladder diagram technique and will allow multiple devices to be entered as against one ladder symbol, as connected by a logical operator, and to be automatically converted into instruction codes in accordance with the operator.

The foregoing object is accomplished by providing a programmable controller programming process comprising: entering a ladder symbol, device names and a operator for connecting the devices using an input device, temporarily displaying the entered data on a display, identifying when the entry of data is terminated, and converting the entered data into a program instruction and displaying it on the display in response to the termination of the data entry.

According to the present invention, following entry of the logical operator for connecting plural devices, the logical operator acts to separate the connected devices at an operator data extractor, connect the separated devices and a ladder symbol, and permit the correct display of the devices and symbol on the display.

It is a further object of the present invention to provide a PC programming process which will allow programs to be written using already-registered common ladder diagram portions without regard to the PC system configuration.

The latter object is accomplished by providing a programmable controller programming process in which a common ladder diagram editor means replaces the device designations specified in the stored common ladder diagram segment with the actual devices used by the PC in accordance with the data in a device comparison table stored in the auxiliary storage device. After the replacement of the device designations is complete, the common ladder diagram is incorporated into the ladder program being written.

BRIEF DESCRIPTION OF THE DRAWINGS

FIG. 4 illustrates a ladder diagram edit screen for performing display conversion processing in the conventional unit and the present invention.

FIG. 5A is a diagram showing the configuration of a screen image table used in the conventional unit and the present invention and FIG. 5B is a illustration of a stored data format.

FIGS. 11 to 14 are diagrams illustrating the process shown in FIG. 10.

In the foregoing drawings, like reference characters designate like or corresponding parts throughout the several views.

DESCRIPTION OF THE PREFERRED EMBODIMENTS

Figure 6:
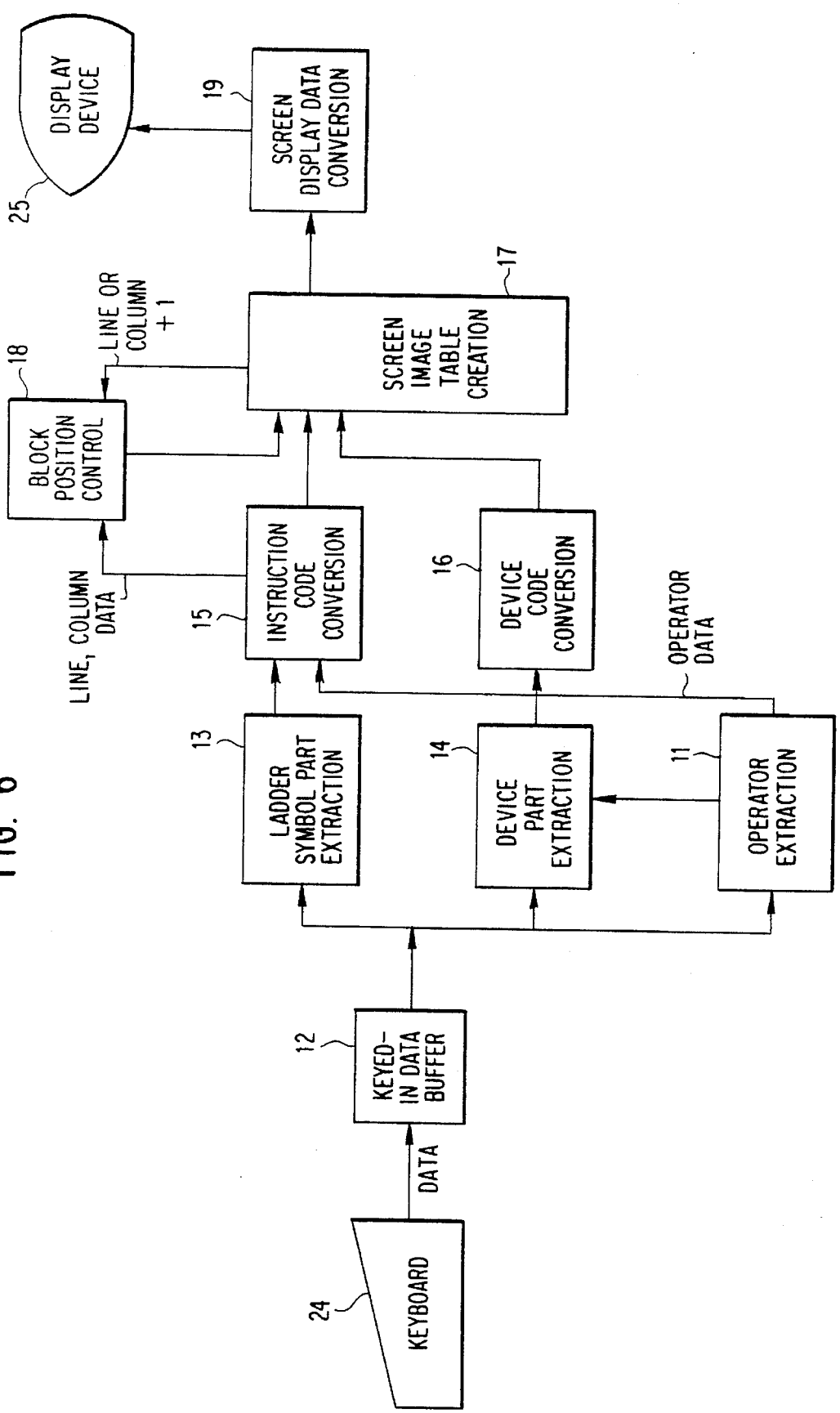
FIG. 6 is a block diagram illustrating the flow of data processing in a PC programing unit according to an embodiment of the present invention.

An embodiment of the present invention will now be described with reference to the drawings. The hardware configuration of the present invention is identical to that of the conventional system shown in FIG. 1. FIG. 6 is a block diagram illustrating the flow of processing and data in writing a ladder diagram in the present invention. In FIG. 6, the elements identified by reference numerals to 19, 24 and 25 are identical to those in the conventional unit. Added to that structure is an operator extraction processor 11 for extracting an operator code from the input data in the keyed-in data buffer 12.

Figure 7:
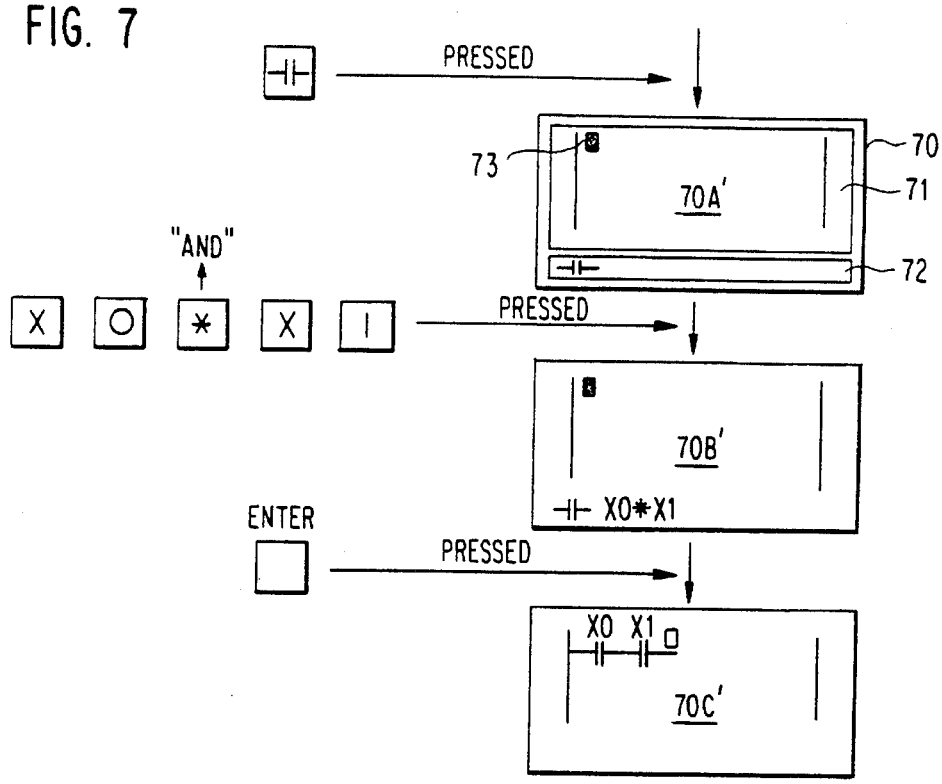
FIG. 7 is a transition diagram of pressed keys and screens for an AND function according to an embodiment of the present invention.

The operation of the present invention will be described with respect to the basic system of FIG. 1, the flow of data and processing in FIG. 6, and an example of the operation of the present invention illustrated in FIG. 7.

Figure 1:
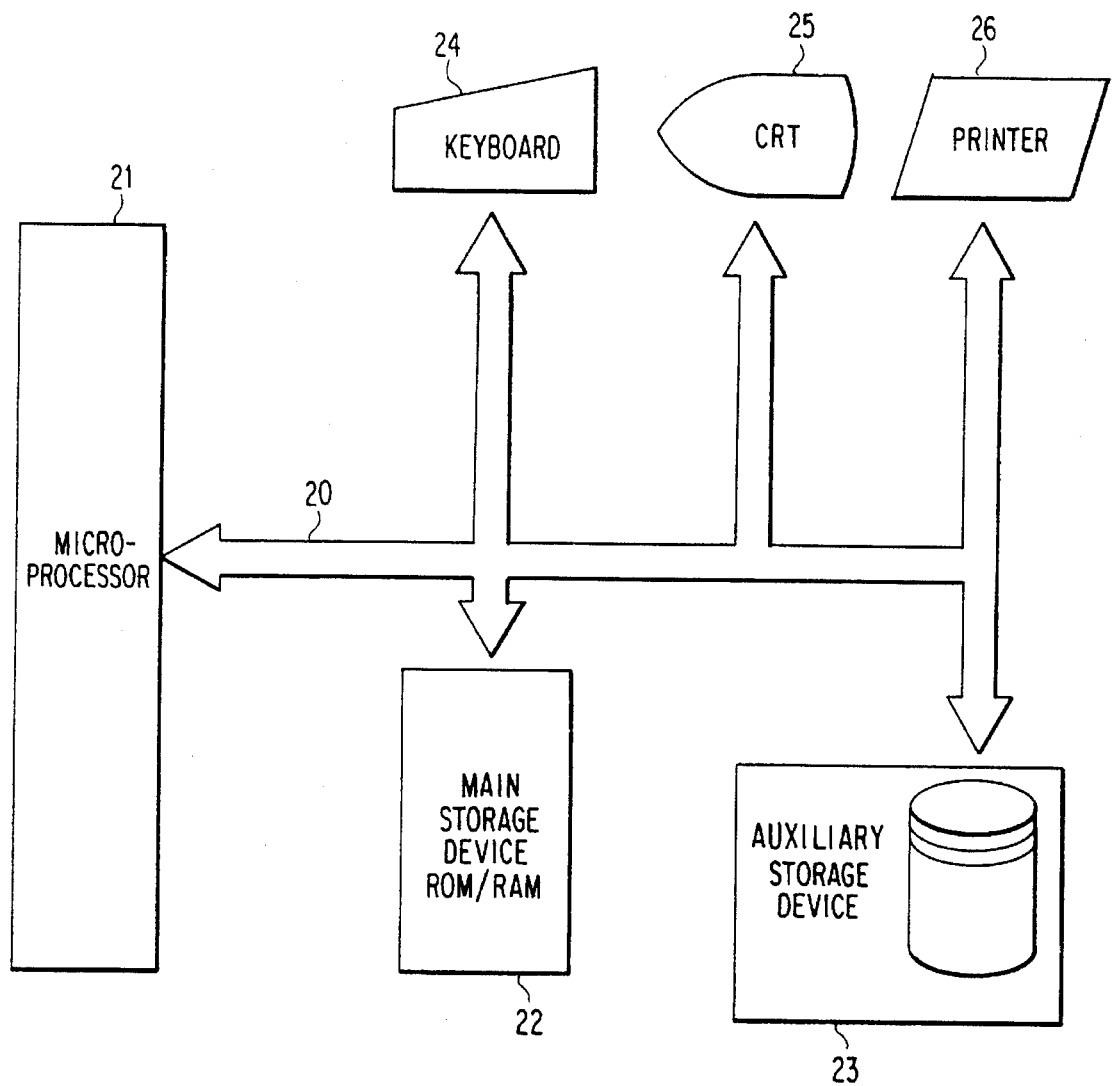
FIG. 1 is a block diagram of the hardware of a conventional PC programming unit.
Figure 2:
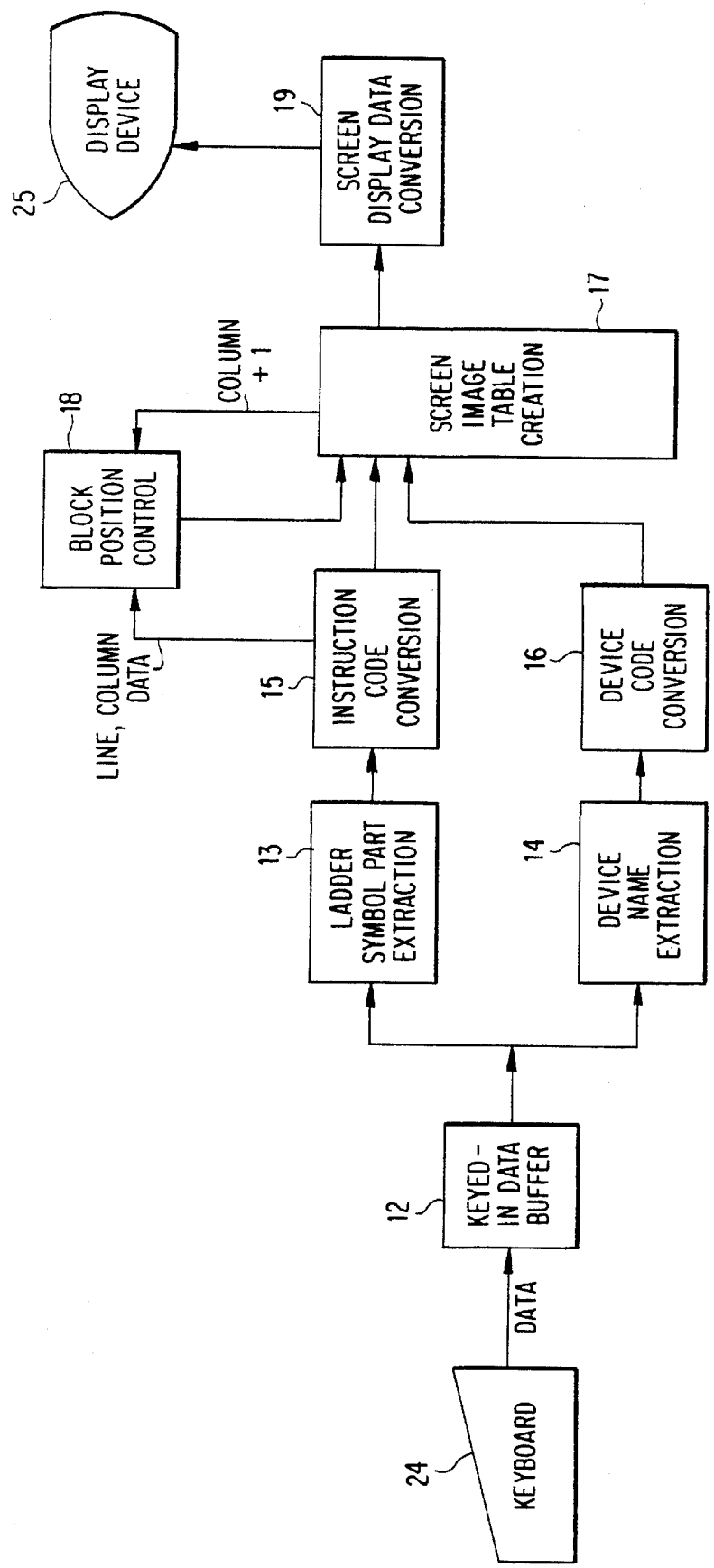
FIG. 2 is a block diagram showing data and processing flows in the conventional programing unit.

In the basic system of FIG. 1, the microprocessor 21 runs a control program, stored in the main storage device 22, which is designed to permit the programming unit to enter a PC program write mode, having a ladder diagram write mode. In the ladder diagram write mode, a cursor is displayed at a position where a ladder diagram symbol is to be entered. When a ladder symbol, for example the "⊢⊣" key on keyboard 24 is pressed in this mode, the keyed-in data is displayed in the keyed-in data display area 72 of CRT 25 and temporarily stored in the keyed-in data buffer 12. Then, when both X0 and X1 are entered as the names of devices, using the single sequence X0 * X1, the keyed-in data is similarly displayed in the keyed-in display data area 72 as shown in screen 70B' and stored in the keyed-in data buffer 12. Finally, when the return key is pressed, the data in the keyed-in buffer 12 is transmitted to the ladder symbol part extraction processor 13, the device part extraction processor 6 and the operator extraction processor 11. In the ladder symbol part extraction processor 13, the ladder symbol is extracted. In the device part extraction processor 14, the devices X0 and X1 joined together by the operator are extracted and held individually. In the instruction code converter 15, an instruction code is generated in accordance with the operator extracted by the operator extractor 11. Since the operator Code "*" represents an AND, the ladder symbol and the operator are converted into instruction codes relevant to instruction "LD" (load), corresponding to the ladder symbol ⊢⊣, and instruction "AND" corresponding to the extracted operator "*", respectively.

In the device code converter 16, the devices X0 and X1 extracted by the device part extraction processor 14 are converted into respective internal processing codes. Completion of the above processing initiates the operation of screen image table creation processor 17.

Figure 3:
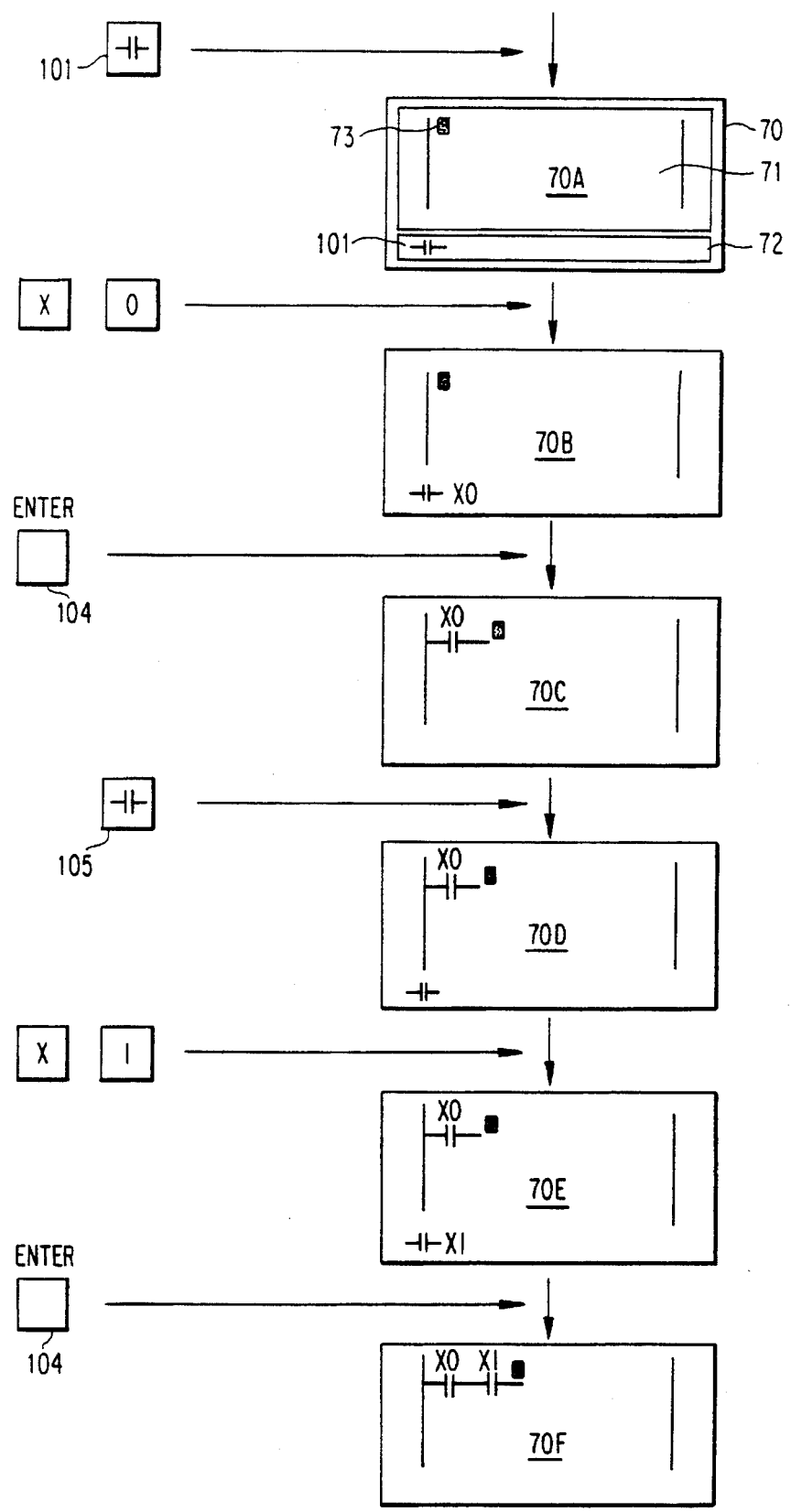
FIG. 3 is a transition diagram of pressed keys and screens in the conventional unit.

The screen image table creation processor 17 combines the first "LD" instruction with the first device name "X0" and stores it an address in the screen image table shown in FIG. 5A relevant to line and column positions of the ladder display/edit area of FIG. 4 indicated by the cursor 73 on the display screen. In the instruction code converter 15, the "AND" instruction is combined with the device name "X1" and stored at a relevant address of the screen image table shown in FIG. 5A. Since, in the expression of ladder language, an "AND" is represented by simply stringing together the ladder symbols, the processor 17, upon recognizing the presence of an AND operator, controls the block position controller 18 so as to advance the column position by +1 for display of a second "⊢⊣" and the associated device X1. Thus, the final display correctly appears, as shown in screen 70C', with two ladder symbols connected in "AND" fashion, together with the devices X0, X1. Through this processing, it becomes unnecessary for the operator to enter the "⊢⊣" symbol key twice when inputting the program instructions, or to use the prior complicated process of keying in sequences of logical operation. Note that more keystrokes were required in FIG. 3 than in FIG. 7, for the same instruction sequence, and that the savings increases as the logical sequence becomes more complex.

Figure 8:
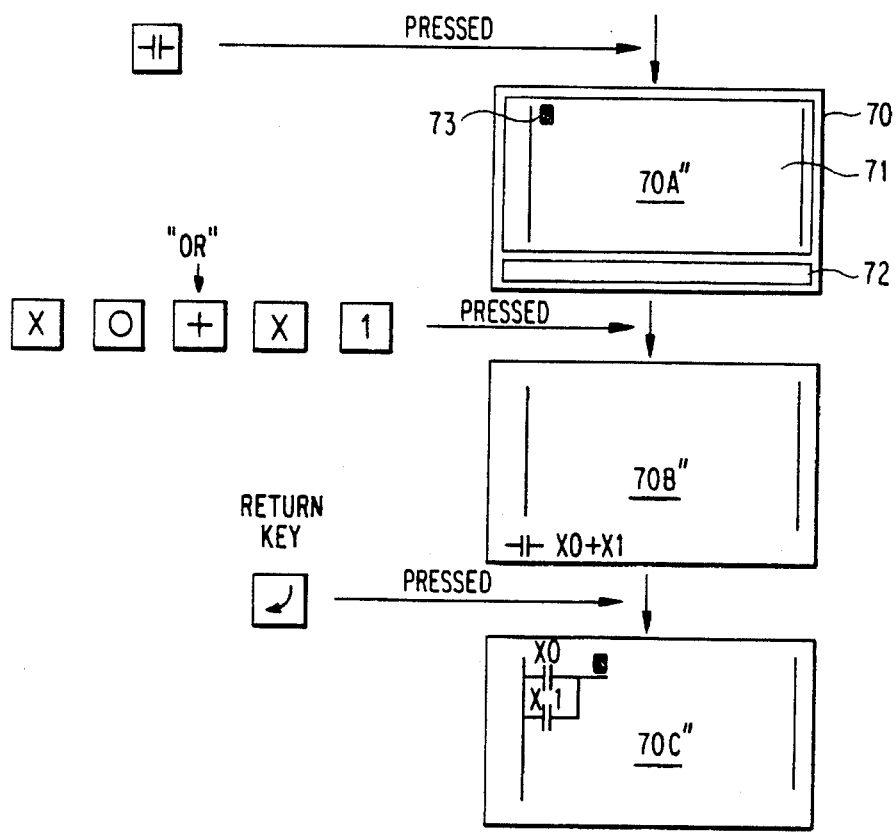
FIG. 8 is an illustration of a transition diagram of pressed keys and screens for an OR function according to an embodiment of the present invention.

FIG. 8 shows the sequence of operations upon entry of an "OR" instruction, wherein the internal processing is identical to that described previously, with the exception that +1 is added to the line position data in FIG. 8 by the table creation processor 17. In the expression of ladder language, an "OR" is indicated by a parallel ladder symbol (see screen 70C"). Thus, it is necessary for the processor 17 to advance the line count in order to properly display the second ladder symbol "⊢⊣" and the second device name X1 in the case of the "OR" instruction. The OR operator is recognized by the processor 17 for this purpose. The line count is returned to its original value after processing the OR operator, so that other symbolic instructions can be indicated on the original line, provided that sufficient column space exists in the given line. Note the cursor position in screen 70C". In any case, the data of the screen image table is converted into data displayable on the display device by the screen display data conversion processor 19 and displayed on the display screen as the final result of the processing begun by pressing the return key as shown in FIGS. 7 or 8.

It will be appreciated that any key indicating termination of entry, e.g., and END key or the like, may be employed instead of the return key in the foregoing embodiment, as the trigger to begin processing the input.

Figure 9:
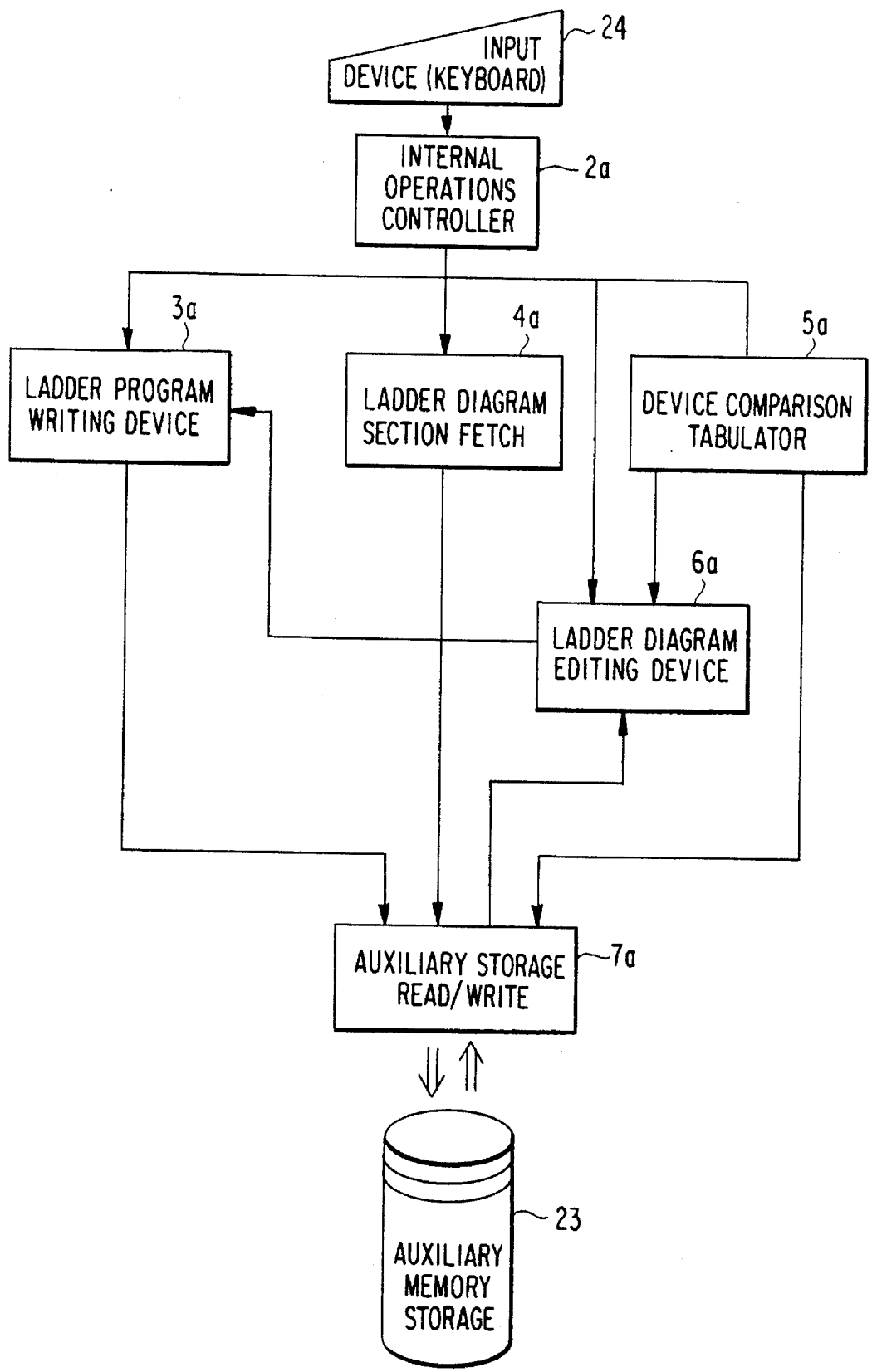
FIG. 9 is a function block diagram of a programmable controller programming unit according to the invention.

FIG. 9 is a block diagram illustrating the apparatus for registration and utilization of a common ladder diagram portion once it is created on the display device (25).

Figure 15:
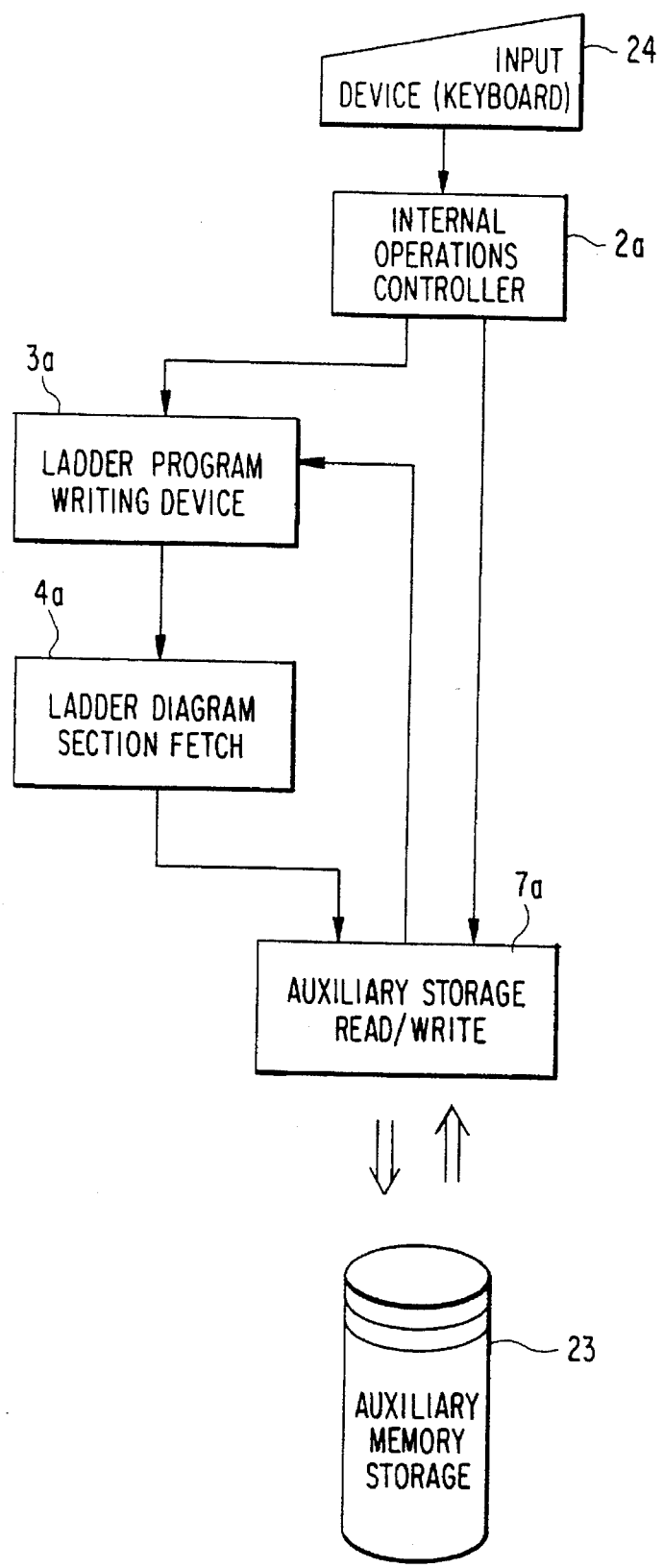
FIG. 15 is a function block diagram illustrating a conventional way of writing and using the common ladder diagram.
Figure 16:
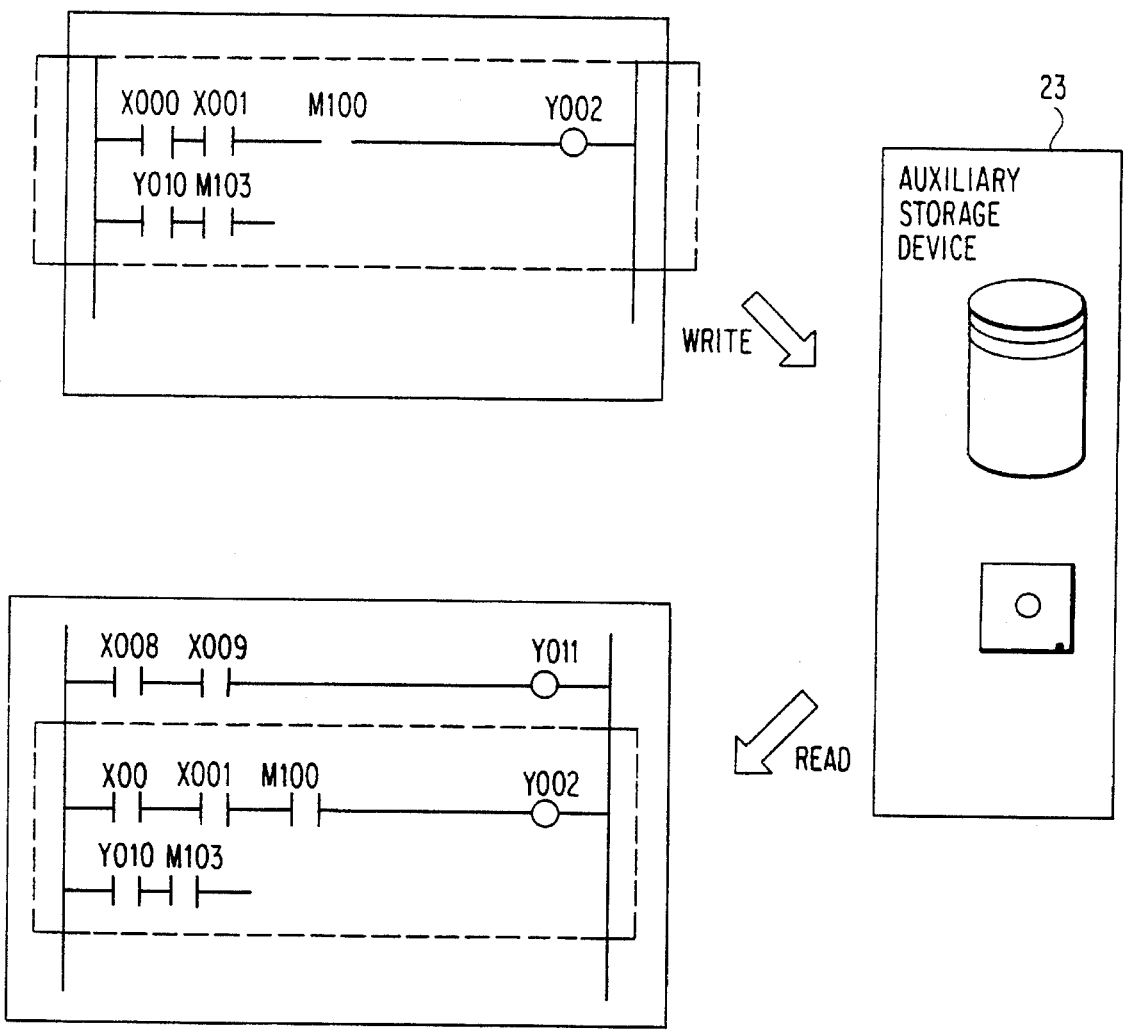
FIG. 16 is a diagram illustrating a flow of data in the conventional unit.

The numerals (23), (24), (2a) to (4a) and (7a) indicate the same parts as those of the prior art in FIG. 15. (5a) indicates a device comparison tabulating means for creating a comparison table between device names used in the common ladder diagram and those actually used by the current PC. (6a) is a common ladder diagram editing means for replacing the device numbers used in the common ladder diagram in accordance with data from the device comparison table and inserting the ladder program into the original program.

Operation of the registration and utilization of the common ladder diagram will now be described with reference to FIGS. 10 to 14.

Figure 10:
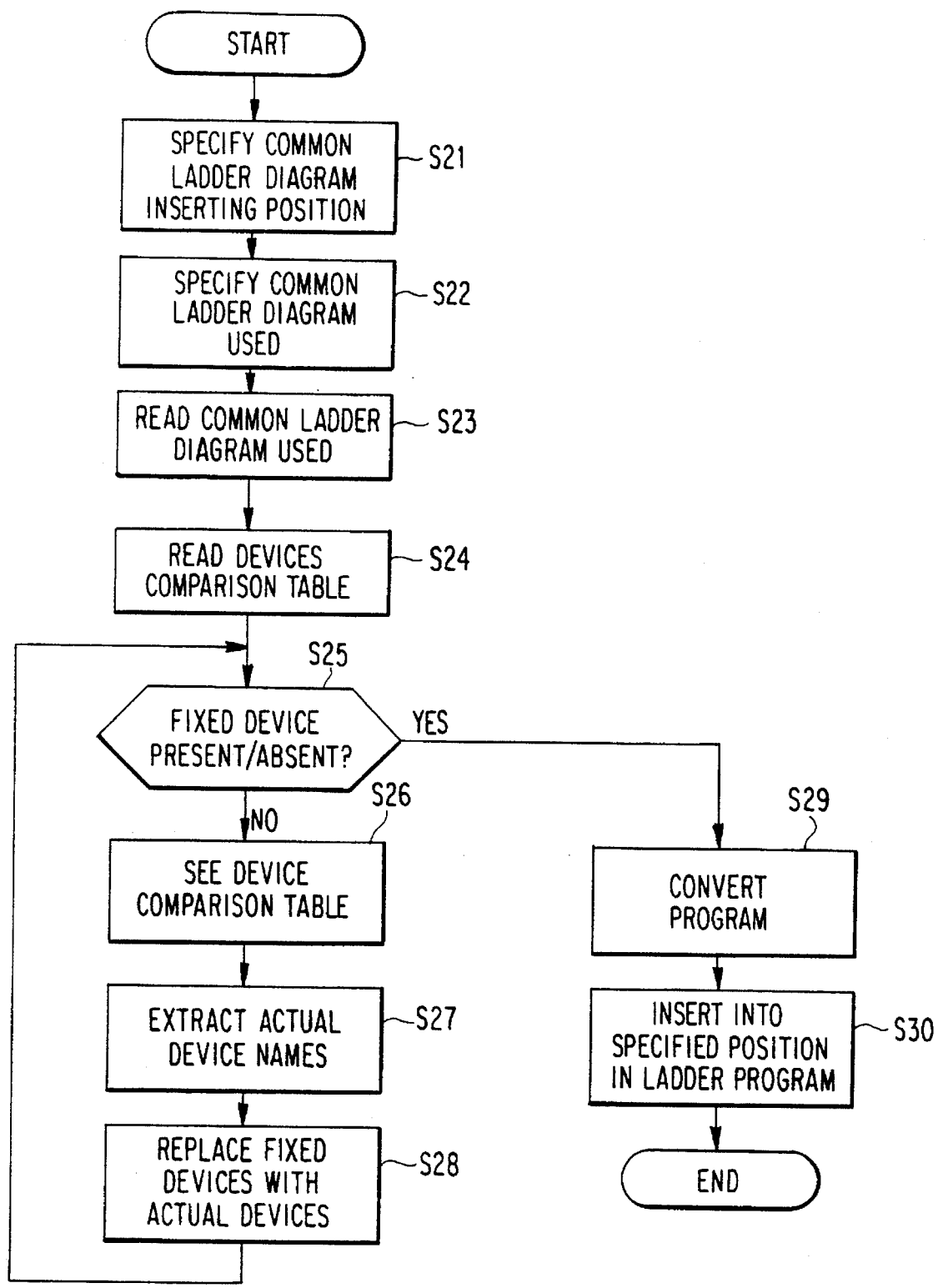
FIG. 10 is a flowchart illustrating the processing of inserting a common ladder diagram into a ladder program in the present invention.
Figure 11:
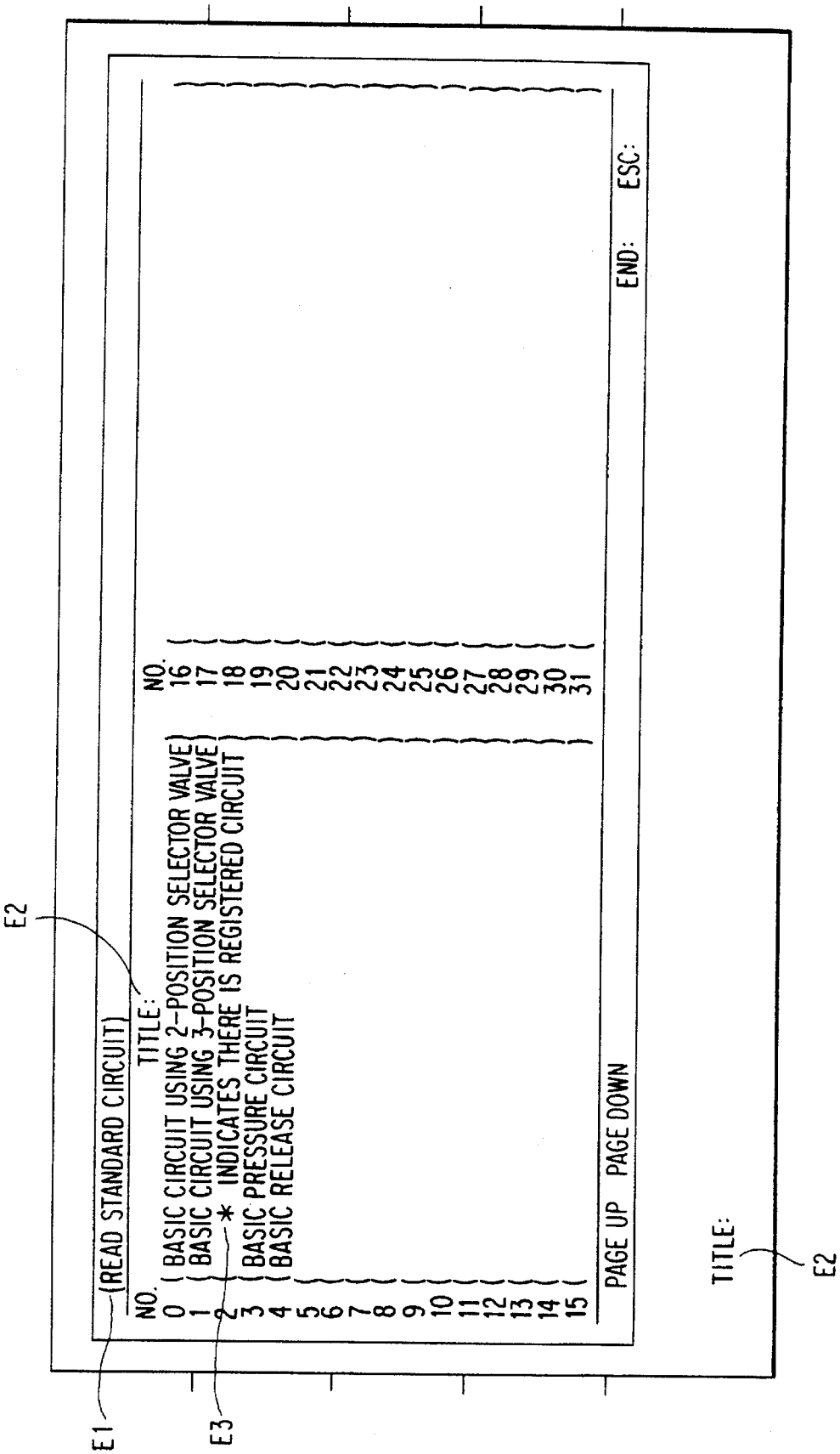

FIG. 10 is a flowchart of a program stored in the main storage device (22) shown in FIG. 1 by the common ladder diagram writing means (4a) shown in FIG. 9. FIG. 11 shows an example of a screen displaying a common ladder diagram that is read from the auxiliary storage device (23) using the common ladder diagram writing means (4a). FIG. 12 shows an example of a screen illustrating setting of the actual device names using the device comparison tabulating means (5a). FIG. 13 illustrates overall operation of the present invention.

The common ladder diagram writing means (4a) writes a ladder diagram in a manner similar to the ladder program writing means (3a). However, the ladder program writing means (3a) uses a device number, corresponding to the actual devices employed by the PC, in the ladder program. In contrast, the common ladder diagram writing means (4a) uses fixed device numbers (designated by "FD" in this embodiment), which differ from the actual device numbers used in writing the ladder program. In order for the common ladder diagram segment to be compatible with the ladder program being created, the fixed device numbers in the common ladder diagram must be converted to actual device numbers.

An example of a common ladder diagram, along with its dedicated device numbers, is indicated by the area enclosed by the dotted line (51) in FIG. 13. The common ladder diagram, after being written, is provided with a serial number and stored in the auxiliary storage device (23) so that it may be recalled when desired.

A setting screen as shown in FIG. 12 is displayed on the display device (25) so that actual device numbers corresponding to the fixed devices FD used by the PC may be entered through the input means (24). Then, the device comparison tabulating means (5a) creates a device comparison table relating the device configuration of the PC for which a program is currently being written to the fixed device names used in the stored ladder segments. A comparison table can be created for each type of PC device configuration, and thus the stored ladder segments can be used for any configuration after conversion. The comparison tables may themselves be stored in auxiliary storage device (23) via auxiliary storage read/write means (7a).

When a common ladder diagram stored in the auxiliary storage device (23) is used during writing of the PC ladder program, the common ladder diagram editing means (6a) is activated by input means (24), which may be in the form of a keyboard, via the control means (2a). A sequence of this operation will be described according to the flowchart in FIG. 10.

First, a common ladder diagram inserting position is specified at step (S21) to determine where to insert the common ladder diagram in the PC ladder program being written. Then, at step (S22), the serial number of the common ladder diagram, to be retrieved from the auxiliary storage device (23) is specified. At step (S23), the specified common ladder diagram is read from the auxiliary storage device (23) via the auxiliary storage device read/write means (7a) and sent to the main storage device 22.

At step (S24), the device comparison table corresponding to the PC, for which the ladder program is being written, is read from the auxiliary storage device (23) and sent to the main storage device (22) via the auxiliary storage device read/write means (7a). FIG. 14 indicates how the data is stored in the device comparison table once written into the main storage device (22). In FIG. 14, an area is secured for each fixed device to store the device number actually used by the PC.

Step (S25) determines whether the fixed device numbers have been extracted from the common ladder diagram read in step (S24). Step (S27) uses the device comparison table, shown in FIG. 12, and fetches the actual device numbers corresponding to the fixed devices. At step (S28), the fixed device numbers are replaced by the actual device numbers. The process is repeated and step (S25) continues searching for fixed device numbers in the common ladder diagram not yet replaced by the actual devices, repeating the processing at steps (S26) to (S28), until replacement of all fixed device numbers is complete.

Numeral (52) in FIG. 13 indicates a common ladder diagram, indicated by (51), in which the fixed device numbers have been converted to actual device numbers in accordance with the device comparison table indicated by (53). After the replacement of all fixed device numbers is complete, step (S29) converts the program into a format usable by the ladder program writing means (3a). Then at step (S29), the converted common ladder diagram is inserted into the ladder program at the inserting position specified at step (S21).

It will be apparent that the present invention, as described above, achieves a programmable controller programming process which will allow a ladder symbol and devices to be combined by an operator code entered from the keyboard. The invention also permits each operator code to be automatically converted into a instruction so that a ladder symbol need not be entered every time a device is specified. With the above capabilities, excellent operability is ensured in data entry.

It will also be apparent that the present invention, as described above, achieves a programmable controller programming process which will allow a common ladder diagram to be written without relying on PC I/O assignment since the common ladder diagram may be written by specifying devices other than those used by the PC. Therefore, device numbers need not be manually corrected according to the PC I/O assignment when the common ladder diagram is used to write a PC ladder diagram, and the device comparison table for the PC corresponding to the program must only be created once. By writing a multiple of those common ladder diagrams, PC programming can be achieved efficiently.

What is claimed:

1. A method of programming a programmable controller comprising a microprocessor, storage means, input means and display means, using a ladder programming technique comprising the steps of:

entering, by a user, at said input means data including a ladder symbol, plural device identifiers corresponding to said ladder symbol and at least one operator connecting the device identifiers;

storing temporarily said entered data in said storage means;

extracting said stored entered data;

converting said ladder symbol and said plural corresponding device identifiers into codes, and assembling said codes as a program instruction in accordance with said at least one operator; and displaying said program instruction in ladder form on said display means, said displaying step comprising a step of displaying two ladder symbols on said display screen at positions relative to each other based only on one said operator.

2. The method of claim 1 further comprising the step of displaying said entered data on said display in response to address information provided by a cursor.

3. A method of programming a programmable controller comprising a microprocessor, storage means, input means and display means, in which each instruction for the programmable controller includes at least two ladder symbols and interconnections therebetween, comprising the steps of:

entering, by a user at said input means, ladder symbol data, identifier data for each of a plurality of devices and operator data connecting said identifier data;

displaying temporarily said entered data on said display means;

identifying, in accordance with a command input by said user, a termination of said data entering step; and converting said data into a program instruction and displaying said program instruction in ladder form on said display means in response to said identifying step, said displaying step comprising a step of displaying two ladder symbols on said display screen at positions relative to each other based on a portion of said operator data relating to a portion of said ladder symbol data representing only a single said ladder symbol.

4. A method of programming a programmable controller comprising a microprocessor, storage means, input means and display means, using a ladder programming technique comprising the steps of:

entering, by a user, at said input means data including a ladder symbol, plural device identifiers corresponding to said ladder symbol and at least one operator connecting the device identifiers;

storing temporarily said entered data in said storage means;

extracting said stored entered data and separating devices connected with said at least one operator and connecting each of the devices with a respective ladder symbol identified by said entered ladder symbol;

converting said ladder symbol and said plural corresponding device identifiers into codes, and assembling said codes as a program instruction in accordance with said at least one operator; and displaying said program instruction in ladder form on said display means, said displaying step comprising a step of displaying two ladder symbols on said display screen at positions relative to each other based on one said operator.

5. In a programmable controller programming apparatus comprising a microprocessor, display means having a display surface, storage means, means for inputting a ladder symbol and device identifier information for a plurality of corresponding devices into said storage means, ladder symbol and device extraction means for extracting and encoding said ladder symbol and device identifier information, and screen image table creation means for storing at individually addressed locations, corresponding to locations on said display surface, said encoded ladder symbol and device identifier information, for generating a display on said display means, the improvement wherein:

said inputting means including means for inputting operators into said storage means, said operators combining plural device identifiers for an equal plurality of devices, said operators and device identifiers being input by a user and corresponding to a single ladder symbol input by a user, each of said operators being used by said display means to display two ladder symbols and controlling positions at which said two ladder symbols are displayed on the display surface relative to each other;

said extracting means including means for separating and storing said device identifiers for each of said plurality of devices, said extracting means further comprising operator extraction means for extracting said operators;

converter means for generating codes in accordance with said device identifiers, operators and said ladder symbol extracted by said extracting means; and said screen image table creation means accessing and storing said coded information, in a pattern determined by said extracted operators.

6. The programmable controller of claim 5 further comprising block position control means, responsive to data from said converter means and said screen image table creation means for identifying an address at which said information is to be stored.

7. The programmable controller of claim 6, wherein said address is incrementable by a predetermined amount is response to said operator data.

8. A method of programming a programmable controller, comprising a microprocessor, storage means, input means and display means, using a ladder programming technique, comprising the steps of:

writing a common ladder diagram using first type device numbers and storing said common ladder diagram in said storage means, said first type device numbers being generated by said microprocessor and of a format type incompatible for use in a programmable controller device configuration;

creating a comparison table between said first type device numbers and second type device numbers by a device comparison tabulating means, said second type device numbers being user entered and of a format compatible for use with a particular programmable controller device configuration;

replacing the first type device numbers in said common ladder diagram with corresponding second type device numbers from said comparison table using a common ladder diagram editing means; and incorporating said common ladder diagram into a ladder program being written, after said first type device numbers in said common ladder diagram are replaced by said corresponding second type device numbers.

9. A method of creating a ladder program for a programmable controller by incorporating into said ladder program a common ladder diagram previously created and stored in a storage means, said common ladder diagram utilizing first type device numbers to refer to devices to be controlled or monitored and said ladder program utilizing second type device numbers to refer to the devices to be controlled or monitored, comprising the steps of:

reading said common ladder diagram from said storage means;

reading a device comparison table from said storage means, said device comparison table relating said first type device numbers used by said common ladder diagram to said second type device numbers used by said ladder program;

replacing said first type device numbers in said common ladder diagram with corresponding second type device numbers obtained from said device comparison table; and incorporating said common ladder diagram into said ladder program after said first type device numbers in said common ladder diagram are replaced by said corresponding second type device numbers.

10. A method according to claim 9, wherein said incorporating of said common ladder diagram is accomplished by converting said common ladder diagrams into a format compatible with said ladder program being written; and inserting said converted common ladder diagram into said ladder program.

11. A method according to claim 9, further comprising the steps of:

specifying an insertion position in said ladder program at which said common ladder diagram is to be inserted; and incorporating said common ladder diagram into said ladder program at said specified insertion position, after said first type device numbers in said common ladder diagram are replaced by said corresponding second type device.

12. An apparatus for creating a ladder program for a programmable controller by incorporating into said ladder program a common ladder diagram previously created and stored in a storage means, said common ladder diagram utilizing first type device numbers to refer to devices to be controlled or monitored and said ladder program utilizing second type device numbers to refer to the devices to be controlled or monitored, comprising:

means for reading said common ladder diagram from said storage means;

means for reading a device comparison table from said storage means, said device comparison table relating said first type device numbers used by said common ladder diagram to said second type device numbers used by said ladder program;

means for replacing said first type device numbers in said common ladder diagram with corresponding second type device numbers obtained from said device comparison table read from said storage means by said device comparison reading means; and means for incorporating said common ladder diagram with said second type device numbers into said ladder program after said first type device numbers in said common ladder diagram are replaced by said corresponding second type device numbers.

13. An apparatus according to claim 12, wherein said incorporating means converts said common ladder diagram into a format compatible with said ladder program being written; and inserts said converted common ladder diagram into said ladder program.

14. An apparatus according to claim 12, further comprising:

means for specifying an insertion position in said ladder program at which said common ladder diagram is to be inserted; and means for incorporating said common ladder diagram into said ladder program at said specified insertion position, after said first type device numbers in said common ladder diagram are replaced by said corresponding second type device.

15. A method of programming a programmable controller comprising a microprocessor, storage means, input means and display means, using a ladder programming technique comprising the steps of:

entering, by a user, at said input means data, such that said entering step comprises the steps of:
entering a first ladder symbol,
entering a first device identifier,
entering a first operator, and
entering a second device identifier, said first and second device identifiers and said first operator corresponding to said first ladder symbol and said first operator connecting the device identifiers;

storing temporarily said entered data in said storage means;

extracting said stored entered data;

converting said first ladder symbol and said corresponding first and second device identifiers into codes, and assembling said codes as a program instruction in accordance with said first operator; and displaying said program instruction in ladder form on said display means, said displaying step comprising a step of displaying two ladder symbols on said display screen at positions relative to each other based on one said first operator.

16. A method of programming a programmable controller comprising a microprocessor, storage means, input means and disparity means, using a ladder programming technique comprising the steps of:

entering, by a user, at said input means data including a ladder symbol, plural device identifiers corresponding to said ladder symbol and at least one operator connecting the device identifiers;.

storing temporarily said entered data in said storage means;

extracting said stored entered data;

converting said ladder symbol and said plural corresponding device identifiers into codes, and assembling said codes as a program instruction in accordance with said at least one operator; and displaying said program instruction in ladder form on said display means, said displaying step comprising a step of displaying two ladder symbols on said display screen at positions relative to each other based on one said operator, wherein said ladder symbol, said plural device identifiers and said at least one operator are entered before performing said step of temporarily storing entered data.

17. A method of programming a programmable controller comprising a microprocessor, storage means, input means and display means, in which each instruction for the programmable controller includes at least two ladder symbols and interconnections therebetween, comprising the steps of:

entering, by a user at said input means, ladder symbol data, identifier data for each of a plurality of devices and operator data connecting said identifier data, said ladder symbol data representing a first ladder symbol, said identifier data representing first and second device identifiers, and said operator data representing a first operator, said first and second device identifiers and said first operator corresponding to said first ladder symbol;

displaying temporarily said entered data on said display means;

identifying, in accordance with a command input by said user, a termination of said data entering step; and converting said data into a program instruction and displaying said program instruction in ladder form on said display means in response to said identifying step, said displaying step comprising a step of displaying two ladder symbols on said display screen at positions relative to each other based a portion of said operator data relating to a portion of said ladder symbol data representing a single said ladder symbol.

18. A method of programming a programmable controller comprising a microprocessor, storage means, input means and display means, in which each instruction for the programmable controller includes at least two ladder symbols and interconnections therebetween comprising the steps of:

entering, by a user at said input means, ladder symbol data, identifier data for each of a plurality of devices and operator data connecting said identifier data;

displaying temporarily said entered data on said display means, wherein said ladder symbol data, identifier data and operator data are entered before performing said step of temporarily displaying entered data;

identifying, in accordance with a command input by said user, a termination of said data entering step; and converting said data into a program instruction and displaying said program instruction in ladder form on said display means in response to said identifying step, said displaying step comprising a step of displaying two ladder symbols on said display screen at positions relative to each other based a portion of said operator data relating to a portion of said ladder symbol data representing a single said ladder symbol.

19. A method of programming a programmable controller comprising a microprocessor, storage means, input means and display means, in which each instruction for the programmable controller includes at least two ladder symbols and interconnections therebetween, comprising the steps of:

entering, by a user at said input means, ladder symbol data, identifier data for each of a plurality of devices and operator data connecting said identifier data;

displaying temporarily said entered data on said display means;

identifying, in accordance with a command input by said user, a termination of said data entering step; and converting said data into a program instruction and displaying said program instruction in ladder form on said display means in response to said identifying step, said displaying step comprising a step of displaying two ladder symbols on said display screen at positions relative to each other based a portion of said operator data relating to a portion of said ladder symbol data representing a single said ladder symbol, wherein said converting step includes the steps of:

converting said ladder symbol data and said identifier data representing a corresponding plurality of device identifiers into codes, and assembling said codes based on at least one operator, which is represented by said operator data and connects said plurality of device identifiers.

20. A method of programming a programmable controller comprising a microprocessor, storage means, input means and display means, in which each instruction for the programmable controller includes at least two ladder symbols and interconnections therebetween, comprising the steps of:

entering, by a user at said input means, ladder symbol data, identifier data for each of a plurality of devices and operator data connecting said identifier data, wherein said ladder symbol data includes a single ladder symbol, said identifier data includes at least two device identifiers corresponding to said single ladder symbol and said operator data includes at least one operator connecting said at least two device identifiers for said single ladder symbol;

displaying temporarily said entered data on said display means;

identifying, in accordance with a command input by said user, a termination of said data entering step; and converting said data into a program instruction and displaying said program instruction in ladder form on said display means in response to said identifying step, said displaying step comprising a step of displaying two ladder symbols on said display screen at positions relative to each other based a portion of said operator data relating to a portion of said ladder symbol data representing a single said ladder symbol.

21. A method of programming a programmable controller comprising a microprocessor, storage means, input means and display means, in which each instruction for the programmable controller includes at least two ladder symbols and interconnections therebetween, comprising the steps of:

entering, by a user at said input means, ladder symbol data, identifier data for each of a plurality of devices and operator data connecting said identifier data;

displaying temporarily said entered data on said display means;

identifying, in accordance with a command input by said user, a termination of said data entered wherein said step of identifying said termination is based on a user input after a user has entered said ladder symbol data representing a single ladder symbol, said identifier data representing at least two corresponding device identifiers and said operator data representing at least one corresponding operator; and converting said data program instruction and displaying said program instruction in ladder form on said display means in response to said identifying step, said displaying step comprising a step of displaying two ladder symbols on said display screen at positions relative to each other based a portion of said operator data relating to a portion of said ladder symbol data representing a single said ladder symbol.

22. A method of programming a programmable controller comprising devices controlled thereby, a microprocessor, a storage device, an input device and a display device having a display screen, said method comprising the steps of:

entering by a user at said input device, ladder symbol data;

displaying, at a first location on said display screen in response to a command entered by a user at said input device, a ladder symbol represented by said entered ladder symbol data while storing said ladder symbol data in said storage device;

entering, by a user at said input device, first data representing a first of said devices controlled by said programmable controller, second data representing a second of said devices controlled by said programmable controller, and third data representing a sequence in which said programmable controller controls said first and second of said devices with respect to each other;

displaying, adjacent to said ladder symbol on said display screen in response to a command entered by a user at said input device, a first symbol represented by said first data, a second symbol represented by said second data, and a third symbol represented by said third data, while storing said first, second and third data in said storage device; and simultaneously displaying, in response to a command entered by a user at said input device, said first symbol adjacent to said ladder symbol at a second location on said display screen, and another ladder symbol and said second symbol adjacent to each other at a third location on said display screen adjacent to said second location, the displaying of said another ladder symbol on said display screen, and a position at which said another ladder symbol is displayed with respect to said ladder symbol displayed at said second location, being controlled in accordance with said third data.

23. A method as claimed in claim 22, wherein said entering an instruction step further causes said microprocessor to convert said ladder symbol data, first data, second data and third data into processing data for use by said programmable controller to control said first and second of said devices.

24. A method as claimed in claim 22, wherein said second and third locations are substantially aligned in a horizontal direction on said display screen.

25. A method as claimed in claim 22, wherein said second and third locations are substantially aligned in a vertical direction on said display screen.

26. A method as claimed in claim 22, wherein said display screen is divided into first and second sections, said first location being in said first section and said second and third locations being in said second section.

27. A method as claimed in claim 22, wherein, in said first, second and third data entering step, said first data is entered first, said second data is entered second, and said third data is entered third.

28. A method as claimed in claim 22, wherein, in said first, second and third data entering step, said first data is entered first, said third data is entered second, and said second data is entered third.

* * * * *